No. 888,499. PATENTED MAY 26, 1908.
W. P. HERBST.
SPOON.
APPLICATION FILED JULY 9, 1906.

Witnesses
J. G. Stinkel
J. J. McCarthy

Inventor
William P. Herbst
by Foster Freeman Watson
Attorneys

UNITED STATES PATENT OFFICE.

WILLIAM P. HERBST, OF WASHINGTON, DISTRICT OF COLUMBIA.

SPOON.

No. 888,499.  Specification of Letters Patent.  Patented May 26, 1908.

Application filed July 9, 1906. Serial No. 325,302.

*To all whom it may concern:*

Be it known that I, WILLIAM P. HERBST, a citizen of the United States, residing at Washington, in the District of Columbia, have invented certain new and useful Improvements in Spoons, of which the following is a description.

The present invention relates to improvements in spoons, and has for its object to provide a spoon comprising a bowl and handle which, while so connected as not to be disengaged by ordinary use, may be readily separated when desired.

The spoon is particularly designed for use at public refreshment places, as it enables each customer to be assured that the spoon furnished him has not been previously used, which is very desirable.

It is well known that at such refreshment places, for example soda water fountains, ice cream booths, etc., it is a very difficult matter to properly clean the spoons which are furnished after they have been used, owing to the short period of time allowed, etc.

By the present invention it is possible to furnish each customer with a spoon which has not been previously used, that is, the bowl and handle being readily separable, a new bowl may be fitted to the handle prior to each use thereof.

Figure 1:
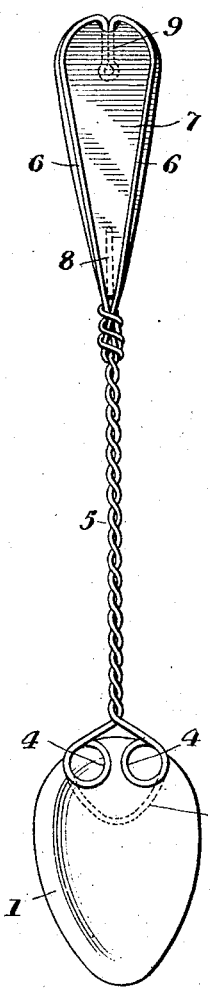
Figure 2:
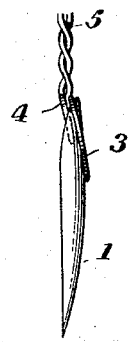
Figure 3:
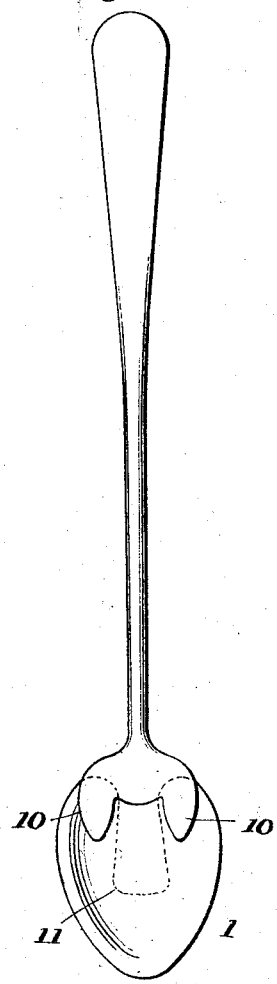

In the accompanying drawing,—Figure 1 is an elevation of a spoon constructed in accordance with the present invention; Fig. 2 is an edge or side view of the bowl and a portion of the handle; Fig. 3 is a view similar to Fig. 1 showing a slightly different form of handle.

Referring to the drawings, 1 designates the bowl of the spoon which is preferably made of paper, or other suitable material, molded or compressed to have the necessary strength and rigidity and coated or otherwise properly treated so as to retain its shape when immersed in liquid.

The handle may be formed in various ways and has one end expanded and so shaped as to extend on opposite sides of the bowl and clamp the latter so securely to the handle that it will not be disengaged by the force or strains produced by using the article but will permit the bowl to be readily withdrawn from engagement with the handle after it has been used, and it is desired to replace it by another.

The handle shown in Figs. 1 and 2 is formed from a single piece of suitable wire, which is first bent upon itself to provide the relatively large supporting section 3 and each branch of which is then formed into a coil or ring 4 which extends within the section 3. The rings 4 are separated from the side of the section 3 sufficiently to permit the edge of the bowl 1 to be inserted therein and the latter will be securely held by the pressure exerted on its opposite faces by said section 3 and rings 4 respectively. The members of the wire forming the handle are twisted together to form a solid body 5 of the desired length and one of said members is then bent to form a frame 6 to receive a card or plate 7 which may bear a suitable advertisement or be ornamented as desired. The free end of the wire forming the frame 6 is then engaged with the body of the handle and turned to extend for some distance along the frame to provide a finger 8 (shown in dotted lines, Fig. 1) for assisting in holding the plate 7 in place, a similar finger 9 being provided at the opposite end of the frame 6 by bending the wire upon itself.

It will be understood that the bowl 1 is of such thickness that while it can be readily forced between the sections 3, 4, of the expanded end of the handle, it will be so closely engaged by said sections as to prevent it being detached from the handle while the spoon is in use. The clamping sections or rings 4, 4, it will be seen, are inclined inwardly slightly toward each other and thereby so related to the section 3 as to firmly clamp the bowl.

In Fig. 3 of the drawing is shown a slightly different form of handle. In this embodiment of the invention, the handle is formed from a solid bar or blank of metal and the expanded end adjacent the bowl is divided into three sections by suitable slots, the side sections 10 being in a different plane from that of the intermediate and relatively long section 11. The manner of using this form of handle is similar to that above described. The edge of a bowl 1 may be readily inserted in the slots separating the sections 10, 11, and the bowl and handle will be securely connected by the pressure exerted on opposite faces of the bowl by said sections.

It will be understood that there may be other modifications of the handle and that the bowl of the spoon may be formed in various ways and from other material than that described without departing from the spirit of the invention.

Having thus described the invention what is claimed is,—

1. A spoon comprising a bowl, and a handle having at one end two separated members that extend across one edge of the bowl and bear respectively upon the concave and convex surfaces thereof.

2. A spoon comprising a bowl, and a handle formed of wire, twisted to provide the stem or body of the handle, and having at one end a pair of integral clamping members which bear respectively upon the concave and convex surfaces of the bowl.

3. A spoon comprising a bowl of pressed or molded paper, and a handle detachably connected with said bowl.

4. A spoon comprising a handle having one end expanded and divided into a plurality of sections, two of which sections occupy a plane at one side of the remainder of said expanded portion, and a bowl having one edge inserted in the space separating said sections and connected with the handle by pressure exerted on opposite sides thereof by the said sections of the expanded end of the handle, substantially as and for the purpose described.

5. A spoon comprising a handle having at one end a plurality of separated resilient clamping members, and a bowl having one edge inserted between and connected with the handle by the pressure of said clamping members, substantially as and for the purpose described.

In testimony whereof I affix my signature in presence of two witnesses.

WILLIAM P. HERBST.

Witnesses:
C. M. SMITH,
O. W. BOND.